US009767639B2

(12) United States Patent
Loz et al.

(10) Patent No.: US 9,767,639 B2
(45) Date of Patent: Sep. 19, 2017

(54) SYSTEM AND METHOD FOR ACCUMULATING AND APPLYING SYMBOL ATTRIBUTES FROM A SECONDARY SYMBOL ARRAY

(71) Applicant: Bally Gaming, Inc., Las Vegas, NV (US)

(72) Inventors: Eyal Loz, Panania (AU); Ross Gilbertson, Ultimo (AU)

(73) Assignee: Bally Gaming, Inc., Las Vegas, NV (US)

( * ) Notice: Subject to any disclaimer, the term of this patent is extended or adjusted under 35 U.S.C. 154(b) by 139 days.

(21) Appl. No.: 14/814,471

(22) Filed: Jul. 30, 2015

(65) Prior Publication Data

US 2017/0032610 A1 Feb. 2, 2017

(51) Int. Cl.

*G06F 17/00* (2006.01)
*G07F 17/32* (2006.01)
*G07F 17/34* (2006.01)

(52) U.S. Cl.

CPC ...... *G07F 17/3213* (2013.01); *G07F 17/3258* (2013.01); *G07F 17/3267* (2013.01); *G07F 17/34* (2013.01)

(58) Field of Classification Search

USPC ....................................................... 463/16–25
See application file for complete search history.

(56) References Cited

U.S. PATENT DOCUMENTS 5,432,047 A 7/1995 Cheng
5,807,172 A 9/1998 Piechowiak
5,947,821 A 9/1999 Stone
5,997,401 A 12/1999 Crawford
6,033,307 A 3/2000 Vancura
6,068,552 A 5/2000 Walker
6,135,884 A 10/2000 Hedrick
6,190,254 B1 2/2001 Bennett
6,193,606 B1 2/2001 Walker
6,270,412 B1 8/2001 Crawford
6,840,858 B2 1/2005 Adams
6,866,583 B2 3/2005 Glavich (Continued)

OTHER PUBLICATIONS

Product Brochure for "Power Wins," Game Concept Version 1.0, Jun. 17, 2014 (6 pages).

(Continued)

*Primary Examiner* — Ronald Laneau

(57) ABSTRACT

A gaming system includes a regulated gaming machine primarily dedicated to playing at least one casino wagering game, the gaming machine including an electronic display device and one or more electronic input devices. The gaming system further includes game-logic circuitry configured to randomly select a first plurality of symbols to populate a symbol array and to randomly select a second plurality of symbols with respective attributes. The game-logic circuitry is further configured to apply attributes of active symbols in the second plurality of symbols that match symbols in any winning symbol combination formed by the first plurality of symbols, wherein the attributes associated with matching ones of the active symbols in the second plurality of symbols have an accumulative effect when applied. An award is awarded for the winning combinations in accordance with the applied attributes.

20 Claims, 13 Drawing Sheets

(56) References Cited

U.S. PATENT DOCUMENTS

| | | | |
|---|---|---|---|
| 6,869,360 B2 | 3/2005 | Marks | |
| 6,997,808 B2 | 2/2006 | Rodgers | |
| 7,137,888 B2 | 11/2006 | Glavich | |
| 7,252,592 B2 | 8/2007 | Rodgers | |
| 7,371,171 B1 | 5/2008 | Englman | |
| 7,371,172 B2 * | 5/2008 | Inoue | G07F 17/3211 273/138.1 |
| 7,399,225 B2 | 7/2008 | Kaminkow | |
| 7,494,413 B2 | 2/2009 | Singer | |
| 7,585,221 B2 | 9/2009 | Singer | |
| 7,699,696 B2 | 4/2010 | Baerlocher | |
| 7,789,744 B2 | 9/2010 | Fiden | |
| 7,789,751 B2 | 9/2010 | Glavich | |
| 7,892,081 B2 | 2/2011 | Glavich | |
| 8,038,524 B2 | 10/2011 | Bryant | |
| 8,109,823 B2 | 2/2012 | Aoki | |
| 8,177,620 B2 | 5/2012 | Miles | |
| 8,177,622 B2 | 5/2012 | Englman | |
| 8,216,053 B2 | 7/2012 | Jaffe | |
| 8,408,987 B2 | 4/2013 | Kaminkow | |
| 8,444,467 B2 | 5/2013 | Englman | |
| 8,591,310 B2 | 11/2013 | Rodgers | |
| 8,747,214 B2 | 6/2014 | Kaminkow | |
| 8,968,076 B2 | 3/2015 | Rodgers | |
| 8,974,288 B2 | 3/2015 | Welty | |
| 9,330,539 B2 * | 5/2016 | Evans | G07F 17/34 |
| 9,472,065 B2 * | 10/2016 | Nicely | G07F 17/34 |
| 2010/0029364 A1 * | 2/2010 | Zielinski | G07F 17/3244 463/20 |

OTHER PUBLICATIONS

Product Sheet for "Wonder Wizard," Free Games Feature, Ainsworth, Release Date Feb. 2014 (1 page).
Product Brochure for "88 Fortunes," V4.0, 2014 Bally Technologies, (2 pages).
Product Brochure for "88 Fortunes," V6.0, 2014 Bally Technologies, (2 pages).
Product Brochure for "88 Fortunes," V2.0, 2014 Bally Technologies, (2 pages).
Product Brochure for "Stroke of Luck," WMS Gaming Inc., Date Unknown, (2 pages).
Article for "Ainsworth's Gaming Evolution Continues" by Club Life Magazine, Mar. 2014, vol. 32, No. 2, p. 56, (1 page).
Product Brochure for "A560SBT" by Ainsworth, CMAA 2014, pp. 2-3 (1 page).

* cited by examiner

SYSTEM AND METHOD FOR ACCUMULATING AND APPLYING SYMBOL ATTRIBUTES FROM A SECONDARY SYMBOL ARRAY

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to accumulated properties of randomly selected symbols that are applied to winning symbol combinations.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

SUMMARY OF THE INVENTION

According to one aspect of the present invention, a gaming system includes a regulated gaming machine primarily dedicated to playing at least one casino wagering game, the gaming machine including an electronic display device and one or more electronic input devices. The gaming system further includes game-logic circuitry configured to detect, via at least one of the one or more electronic input devices, a physical item associated with a monetary value that establishes a credit balance, and to initiate the casino wagering game in response to an input indicative of a wager covered by the credit balance. The game-logic circuitry is further configured to randomly select a first plurality of symbols to populate a symbol array, and to display the first plurality of symbols in the symbol array on the electronic display device. The game-logic circuitry is also configured to randomly select a second plurality of symbols with respective attributes, and to display the second plurality of symbols and their respective attributes on the electronic display device. The game-logic circuitry is further configured to apply the attributes of active symbols in the second plurality of symbols that match symbols in any winning symbol combination formed by the first plurality of symbols. The attributes are associated with matching ones of the active symbols in the second plurality of symbols have an accumulative effect when applied. The game-logic circuitry is also configured to award an award for the winning combinations in accordance with the applied attributes, and to receive, via at least one of the one or more electronic input devices, a cashout input that initiates a payout from the credit balance. The gaming system may be incorporated into a single, freestanding gaming machine.

According to another aspect of the invention, a method is directed to operating a gaming system that includes game-logic circuitry and a regulated gaming machine. The gaming machine is primarily dedicated to playing at least one casino wagering game, and one or more electronic display devices and one or more electronic input devices. The method includes detecting, via at least one of the one or more electronic input devices, a physical item associated with a monetary value that establishes a credit balance, and initiating the casino wagering game in response to an input indicative of a wager covered by the credit balance. The method further includes randomly selecting, by the game-logic circuitry, a first plurality of symbols to populate a symbol array, and displaying the first plurality of symbols in the symbol array on at least one of the one or more electronic display devices. The method also includes randomly selecting, by the game-logic circuitry, a second plurality of symbols with respective attributes, and displaying the second plurality of symbols and their respective attributes on at least one of the one or more electronic display devices. The method further includes applying the attributes of active symbols in the second plurality of symbols that match symbols in any winning symbol combination formed by the first plurality of symbols. The attributes associated with matching ones of the active symbols in the second plurality of symbols are accumulated when applied. The method also includes awarding, by the game-logic circuitry, an award for the winning combinations in accordance with the applied attributes, and receiving, via at least one of the one or more electronic input devices, a cashout input that initiates a payout from the credit balance.

Additional aspects of the invention will be apparent to those of ordinary skill in the art in view of the detailed description of various embodiments, which is made with reference to the drawings, a brief description of which is provided below.

Figure 1:
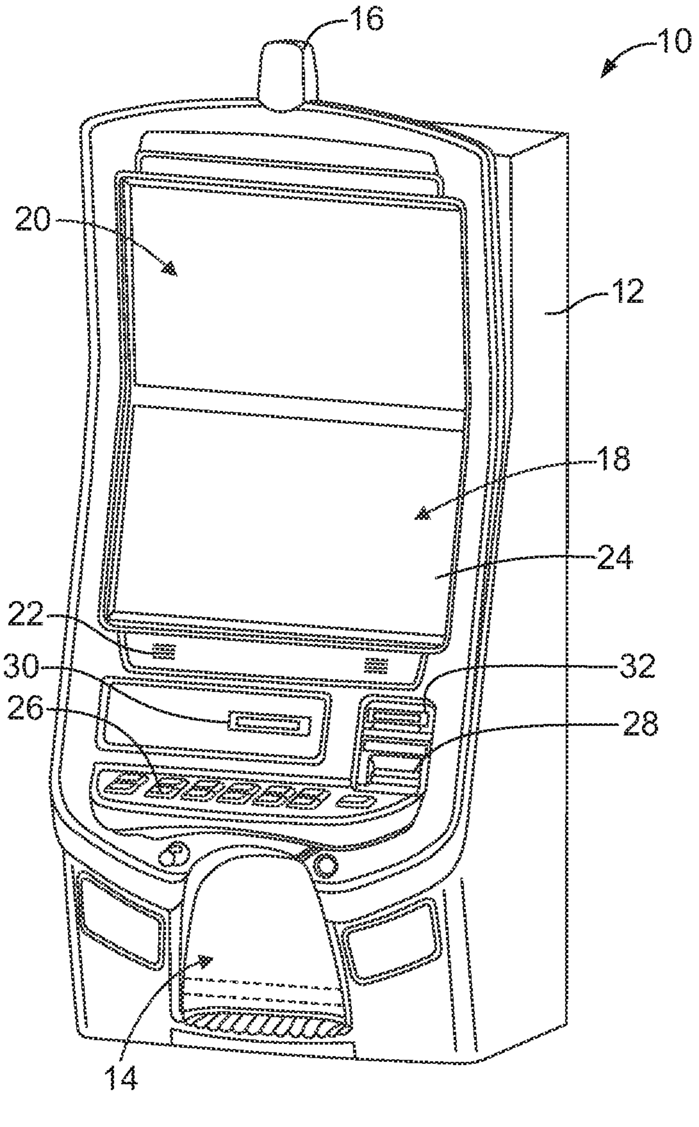
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
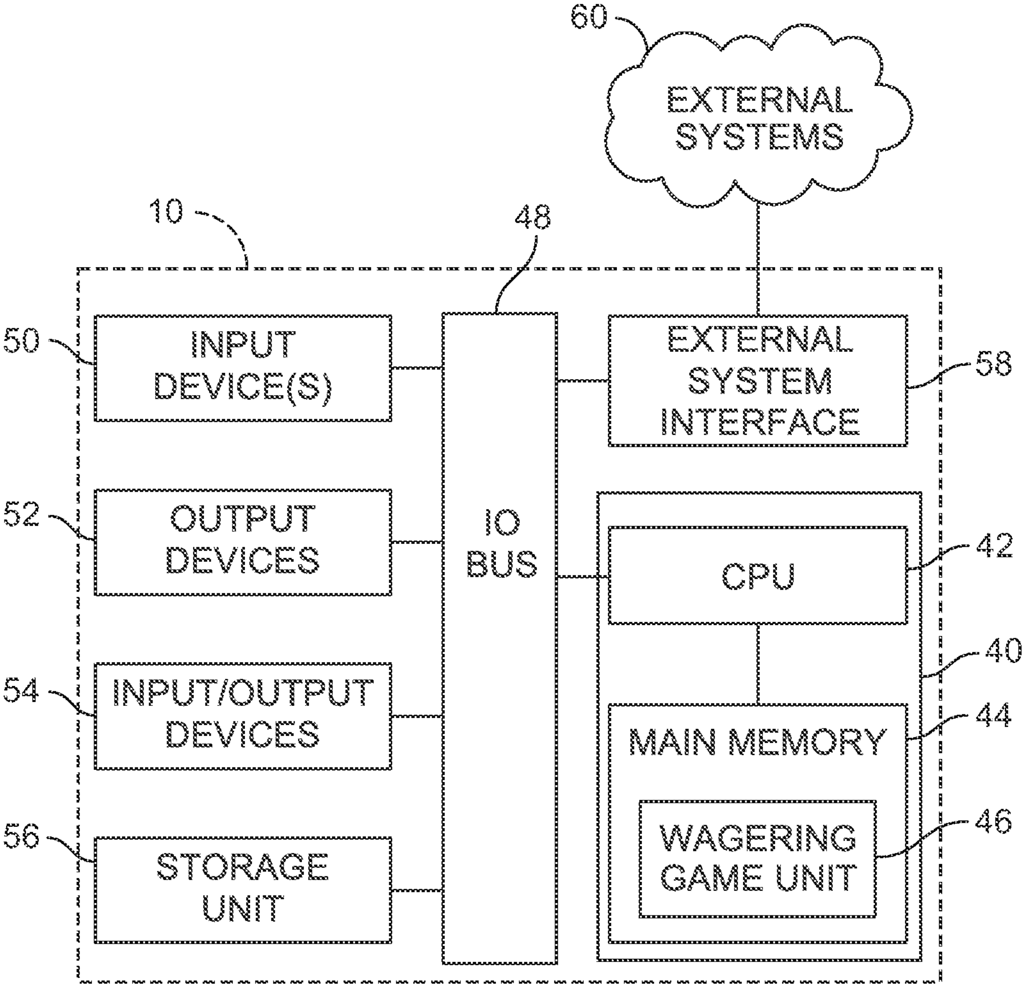
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RING), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
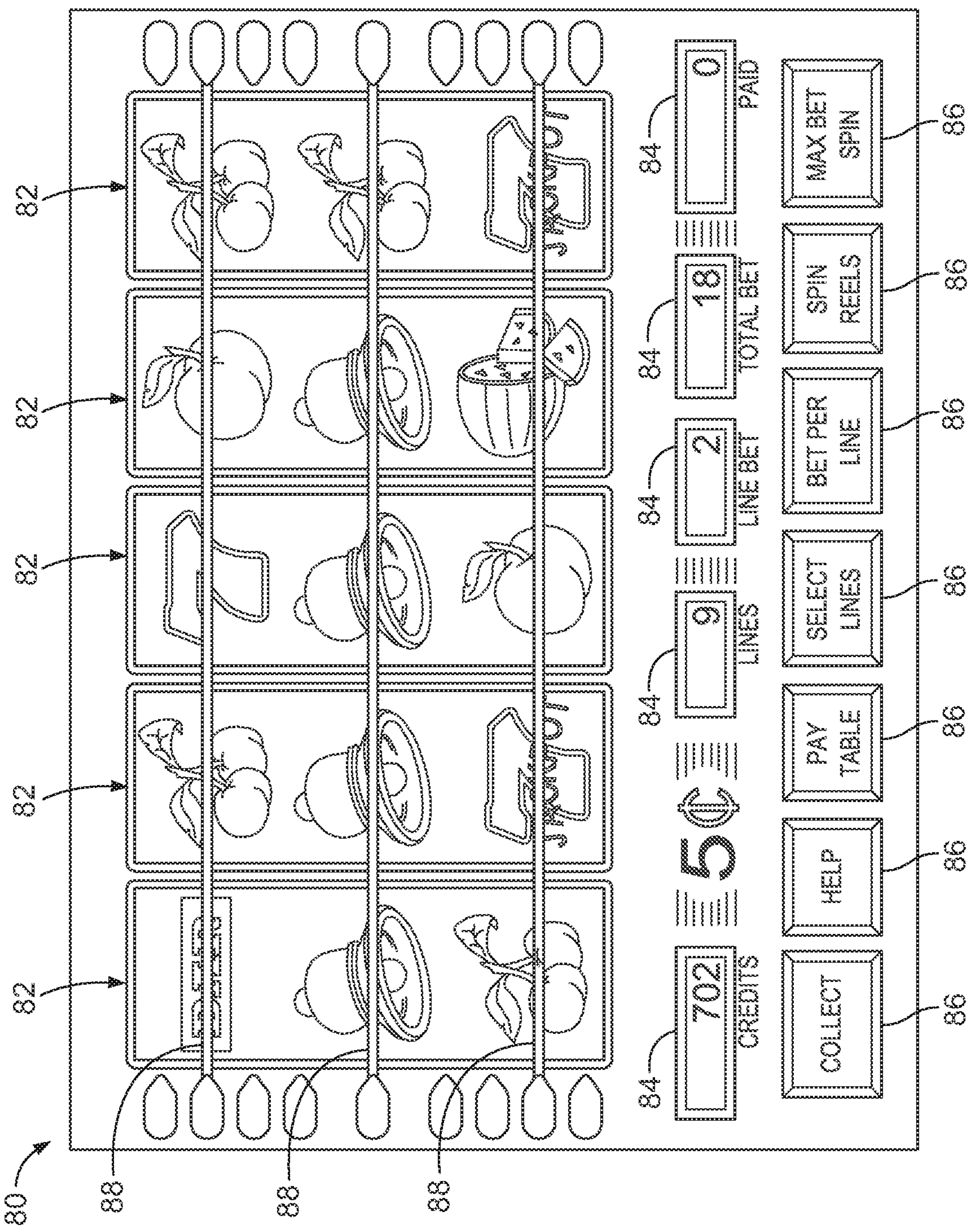
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example).

As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
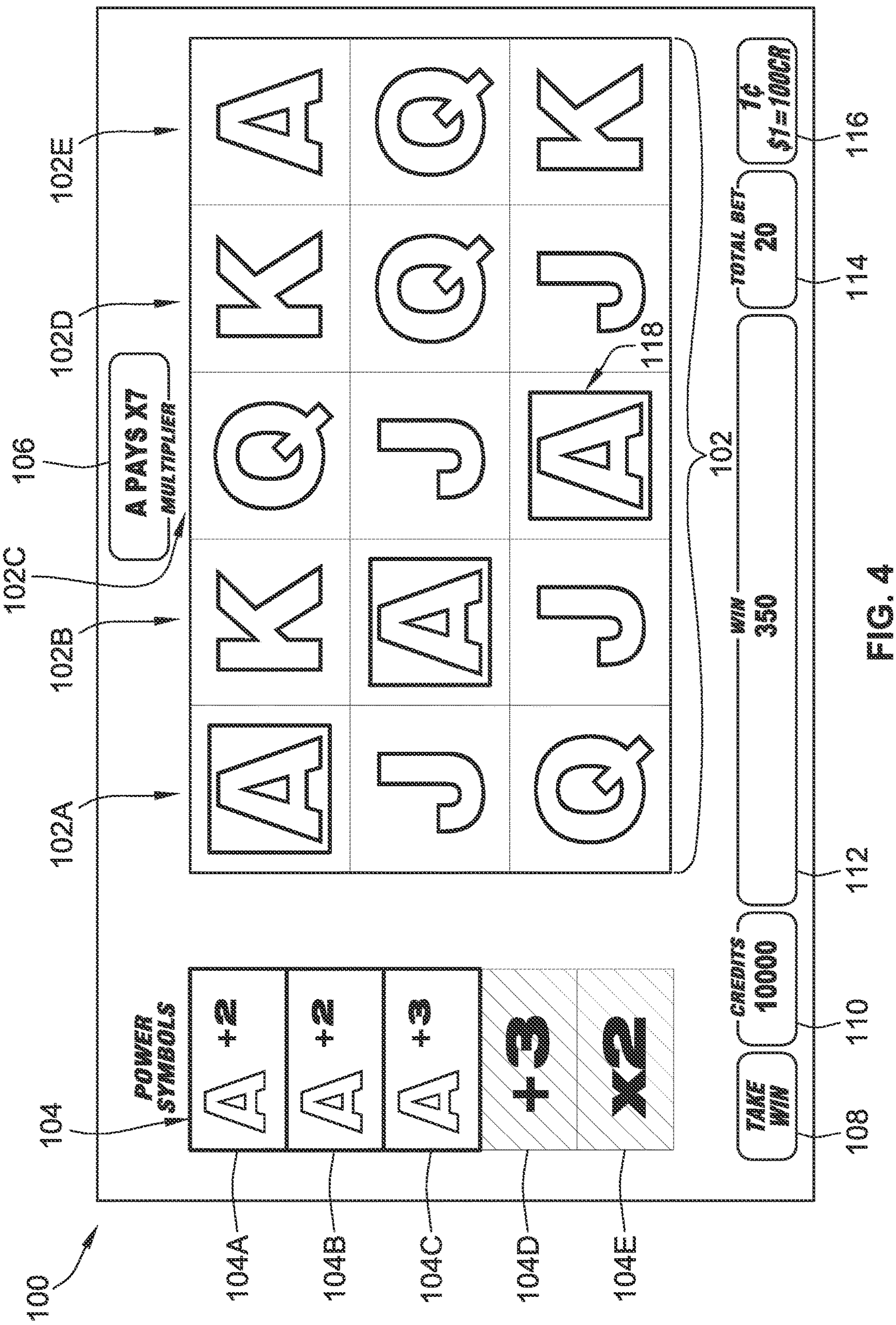
FIG. 4 is an instance of a game screen having a secondary symbol array with symbol attributes displayed on a gaming machine, according to an embodiment of the present invention.

Referring now to FIG. 4, an instance of a game screen 100 illustrates a wagering game in which accumulated attributes are associated with randomly selected symbols and, then, the accumulated attributes being applied to any winning symbol combinations to which the selected symbols contribute. The game screen 100 shows an illustrated image that is adapted to be displayed on the primary display 18 or the secondary display 20, and, in addition to or instead of the features described below, optionally includes one or more of the features described in reference to and illustrated in FIG. 3 (e.g., credit meters 84, touch screen buttons 86, paylines 88, etc.).

The game screen 100 includes a plurality of symbol-bearing reels 102, a secondary symbol array 104, and a plurality of credit meters and game indicators 106-116. The plurality of reels 102 includes five reels—a first (leftmost) reel 102A, a second (left-middle) reel 102B, a third (middle) reel 102C, a fourth (right-middle) reel 102D, and a fifth (rightmost) reel 102E. Each of the reels 102, similar to the reels 82 of FIG. 3, are rotated and stopped to place symbols on the reels in visual association with active paylines, e.g., scattered paylines, left-to-right paylines, right-to-left paylines, etc. The evaluation of winning outcomes displayed by the reels 102 is optionally done regardless of wager size and/or number of symbols activated in the secondary symbol array 104. The activation of symbols in the secondary symbol array 104 is described in more detail below, but, in general, a player input is received to activate one or more of the symbols 104A-104E. According to one wagering structure, the wagers range from 1-30 credits, with wager multipliers of "1×," "2×," "3×," "5×," or "15×."

In the illustrated embodiment of FIG. 4, the reels 102 place three symbols—top, middle, and bottom symbol positions—in visual association with the paylines. However, in other embodiments, the number of reels and the number of symbols placed in visual association with the paylines may vary. For example, three symbol-bearing reels 102 with five symbols are placed in visual association with the paylines. The visual association of the symbols of reels 102 with the paylines indicates winning combinations that are paid in accordance with a pay table.

Optionally, the symbols of reels 102 that are placed in visual association with the paylines are unique per each column to avoid symbol stacks, and, consequently, limit the number of payouts that is otherwise provided by symbol stacks occurring in the game. In other words, none of the symbols in any of the three symbol positions of a respective reel column is a repeating symbol. For example, the first reel 102A shows an "A" symbol, a "J" symbol, and a "Q" symbol—each being unique in the displayed positions of the first reel 102A. Thus, by way of example, there are no two "A" symbols in the displayed positions of the first reel 102A. According to another optional embodiment, the reels 102 do not include any wild symbols.

The secondary symbol array 104 is illustrated in this example as a single symbol-bearing reel that is displayed adjacent to the reels 102 and has a plurality of symbols in respective positions 104A-104E, which includes a first (top) position 104A, a second (top-middle) position 104B, a third (middle) position 104C, a fourth (bottom-middle) position 104D, and a fifth (bottom) position 104E. According to alternative embodiments, the number of symbol positions is more or less than the illustrated five positions, and the secondary symbol array 104 has multiple reels. For ease of understanding, the secondary symbol array 104 is referred below as the single reel 104.

Each symbol position of the single reel 104 has a symbol and a corresponding attribute. The symbols of the single reel 104 are randomly selected from symbols of the same pay table from which the symbols of reels 102 are randomly selected, and are also referred to as "Power" symbols whose attributes enhance the winning combinations of reels 102 to "Power Wins." For example, the first position 104A has an "A" symbol and a corresponding "+2" attribute. The "+2" attribute is a multiplier attribute that indicates to a player a multiplier value by which an award will be multiplied if a winning combination is achieved in the reels 102 with "A" symbols. In other words, the "+2" attribute corresponding to the "A" symbol displayed in the first position 104A of the single reel 104, is applicable to any winning combination having the same, or matching, symbol in the reels 102 (i.e., "A" symbol), such as the winning combination 118 that consists of three "A" symbols placed in the top position of the first reel 102A, the middle position of the second reel 102B, and the bottom position of the third reel 102C.

The attributes have an accumulative effect, however, when applied to the award. Thus, the attributes of other matching symbols from the single reel 104 are accumulated to apply a modified (e.g., increased) attribute to the respective winning combinations achieved in the reels 102. For example, in addition to the "+2" attribute of symbol "A" in the first position 104A of the single reel 104, two additional matching symbols "A" show a second "+2" attribute in the second position 104B and a "+3" attribute in the third position 104C. The cumulative value of the three attributes in positions 104A-104C of the single reel 104 is "+7" (="+2+2+3"). Thus, as displayed in the multiplier indicator 106, the award associated with the "A" three-of-a-kind winning combination 118 is multiplied with a "+7" multiplier. Assuming that the base award, without the multiplier, is 50 credits for the "A" three-of-a-kind winning combination 118, the total award is 50 credits*"7×" multiplier=350 credits (as displayed in the win indicator 112). The game screen 100 displays as visual cue for the player to "Take Win" in an award notification window 108.

To be applicable to winning combinations achieved in the reels 102, the "Power" symbols in positions 104A-104E in the single reel 104 require activation. According to one example, the activation of the "Power" symbols in positions 104A-104E is based on wager size. For example, a single credit wager activates only the first "Power" symbol 104A, but a maximum wager (e.g., 30 credits) activates all the symbols of the single reel 104. Thus, wagers equal to or exceeding certain threshold values activate a respective number of the symbols of the single reel 104. For example, a wager of 1-5 credits activates only the first "Power" symbol 104A, a wager of 6-10 credits activates both the first and second "Power" symbols 104A, 104B, a wager of 11-20 credits activates the first three "Power" symbols 104-104C, a wager of 21-29 credits activates the first four "Power" symbols 104A-104D, and a maximum wager of 30 credits activates all five "Power" symbols 104A-104E.

The "Power" symbols of the single reel 104 are optionally selected and or displayed before the first reel 102A has stopped spinning. Thus, the single reel 104 stops spinning before the first reel 102A stops spinning. This sequence feature reinforces the element of anticipation for each spin of a wagering game. Another benefit of this sequence feature is that it adds additional game elements to improve the player experience. Thus, if a wagering game is required to last a certain time period, e.g., 5 seconds or more, the sequence feature is likely to provide an increased entertainment value for the player.

In the embodiment illustrated in FIG. 4, only the first three "Power" symbols 104A-104C are active. The last two "Power" symbols 104D and 104E are inactive and are typically displayed to the player in grayed-out or other deemphasized form. Optionally, and although inactive, the last two "Power" symbols 104D and 104E are nevertheless displayed to the player as encouragement for the player to wager more during the next spin. In other words, by displaying achieved but inactive symbols or attributes, the player is likely to increase his or her next wager in an attempt to increase the multiplier cumulative effect applicable to a next winning combination.

In addition to "Power" symbols with attributes, such as the "A" symbols of the first active positions 104A-104C, the "Power" symbols of the single reel 104 optionally include other attributes, such as wild multipliers that are in the form of an additive wild multiplier or a multiplicative wild multiplier. The wild multipliers are attributes that apply to all symbols, not just to one particular symbol. Thus, for convenience purposes because no actual symbols are displayed (e.g., "A," "J," etc.) in the respective fourth and fifth positions 104D, 104E, the wild multiplier attributes are also referred to as "Power" symbols, which inherently apply to all the symbols. The additive wild multiplier adds the respective value to the value of any other symbol in the single reel 104. For example, if the fourth inactive "Power" symbol 104D, which is a "+3" additive wild multiplier, is an active "Power" symbol, the "A" winning combination 118 achieved in the reels 102 is multiplied by a "10×" multiplier: "+2" (104A) "+2" (104B) "+3" (104C) "+3" (104D).

The multiplicative wild multiplier multiplies by the respective value the value of any other symbol in the single reel 104. For example, if the fifth inactive "Power" symbol 104E, which is a "×2" multiplicative wild multiplier, is an active "Power" symbol (in addition to the fourth "Power" symbol 104D being active), the "A" winning combination 118 achieved in the reels 102 is multiplied by a "20×" multiplier: ["+2" (104A) "+2" (104B) "+3" (104C) "+3" (104D)]"×2" (104E). In other words, the values of the first four "Power" symbols 104A-104D are added to each other, with the resulting value of "10×" being multiplied by the multiplier value of the fifth "Power" symbol 104E, with the total multiplier value being "20×." Optionally, in a base game in which in which the number of active "Power" symbols provided is limited to five "Power" symbols with multipliers ranging from "+2" to "+5," the maximum "Power Win" multiplier that is possible is "25×."

Figure 5:
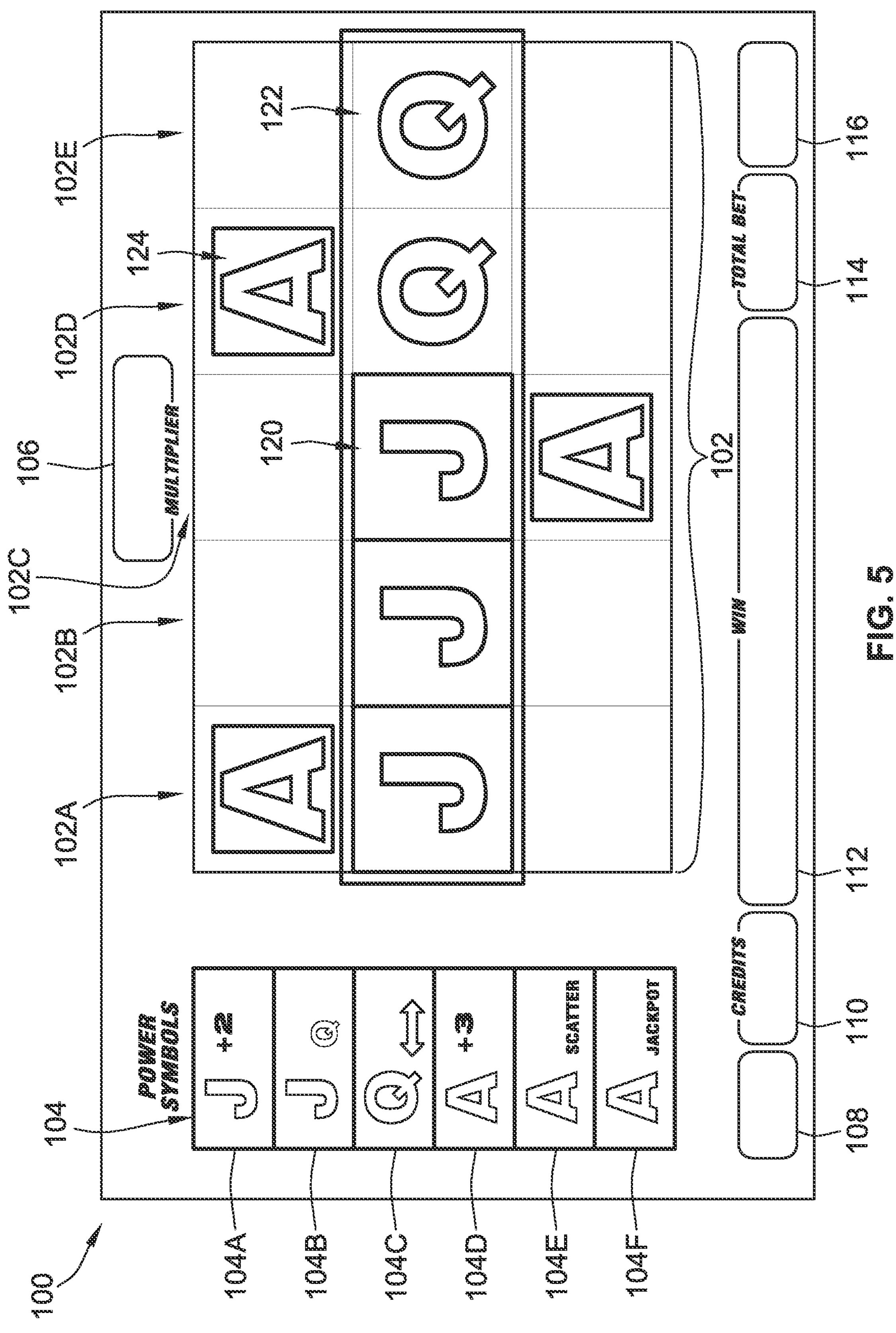
FIG. 5 illustrates another instance of the game screen of FIG. 4 with the secondary symbol array having different symbol attributes displayed on the gaming machine, according to an embodiment of the present invention.
Figure 6:
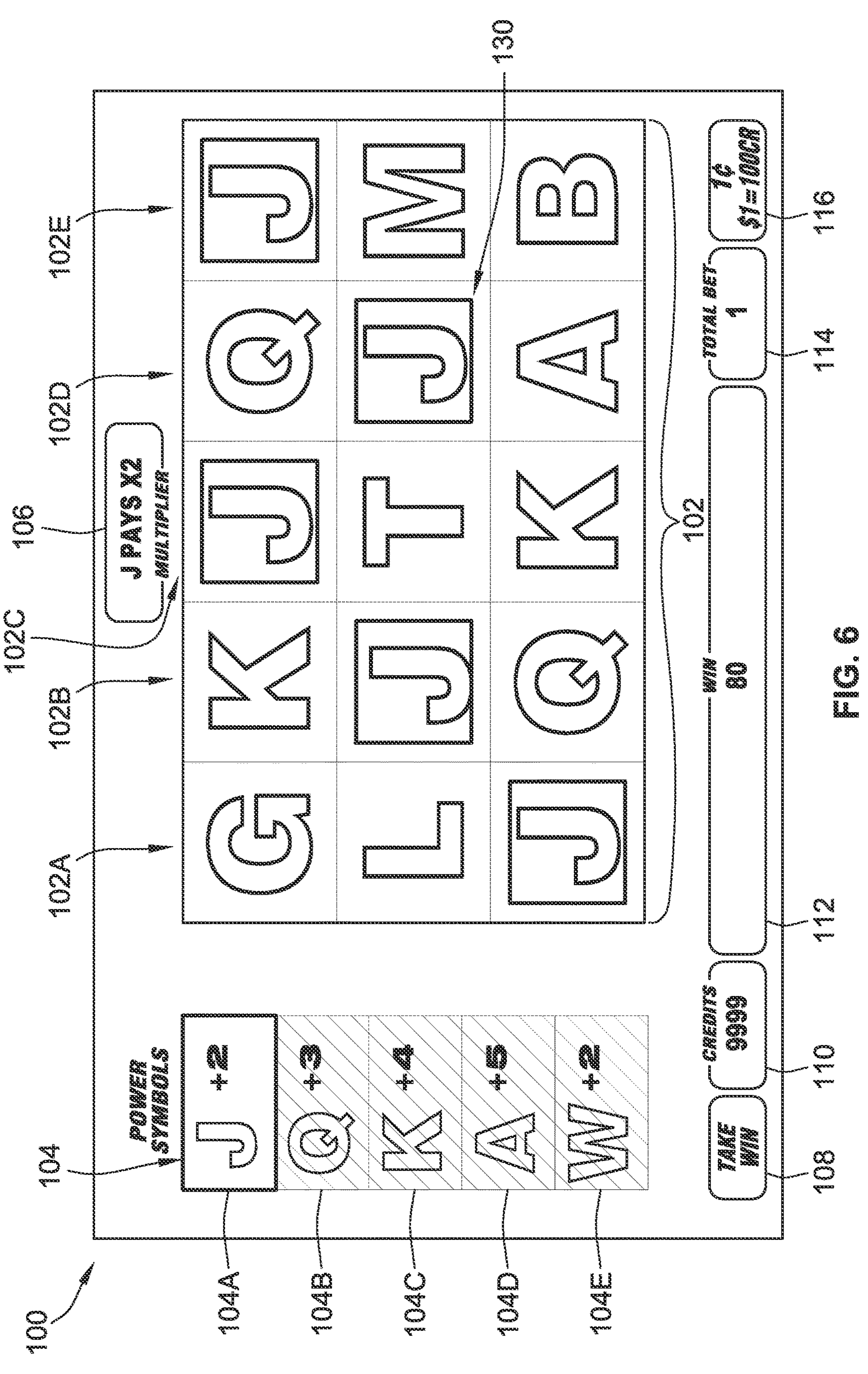
FIG. 6 illustrates another instance of the game screen of FIG. 4 in which a single "Power" symbol is activated, according to an embodiment of the present invention.

Referring to FIG. 5, another instance of the game screen 100 illustrates different attributes that are associated with the symbols of the single reel 104, in addition to or instead of the multiplier value attributes described above in reference to FIG. 4. For ease of understanding, the single reel 104 is illustrated with six symbol positions, including a sixth "Power" symbol 104F, and the reels 102 are illustrated only with symbols of winning combinations.

According to one example, one of the different attributes provides a free game feature or a jackpot for the winning symbol combination formed by the particular symbol when the trigger attribute is associated with that particular symbol. The free game feature includes, for example, 5, 10, or 15 free games for a 3-of-a-kind win, a 4-of-a-kind win, or a 5-of-a-kind win. The jackpot includes, for example, a mini jackpot prize, a major jackpot prize, or a grand jackpot prize for a 3-of-a-kind win, a 4-of-a-kind win, or a 5-of-a-kind win. By way of example, the sixth "Power" symbol 104F shows a "Jackpot" attribute that is associated with the "A" symbol. Thus, any winning combination formed by "A" symbols in the reels 102 will receive a jackpot award.

According to another example, another one of the different attributes provides a win in multiple directions, i.e., left-to-right or right-to-left, for a particular symbol when a multi-directional win attribute is associated with the particular symbol. By way of example, the third "Power" symbol 104C shows a double-arrow sign "⇆" attribute that is associated with the "Q" symbol. Thus, any winning combination formed by "Q" symbols in the reels 102 will provide a win in both left-to-right and right-to-left directions.

According to yet another example, another one of the different attributes provides a scatter win for the particular symbol when a scatter win attribute is associated with the particular symbol. By way of example, the fourth "Power" symbol 104E shows a "SCATTER" attribute that is associated with the "A" symbol. Thus, winning combinations achieved in the reels 102 include scatter wins formed by "A" symbols.

According to yet another example, another one of the different attributes substitutes a particular symbol for another symbol (or symbols) when a generic (e.g., wild) or specific (e.g., "J" symbol substitutes for "Q" symbol) symbol substitution attribute is associated with the particular symbol. By way of example, the second "Power" symbol 104B shows a "Q" substitute attribute that is associated with the "J" symbol. Thus, "J" symbols achieved in the reels 102 are substituted for "Q" symbols in determining a winning combination In view of the above attribute examples, the reels 102 include several winning combinations that would otherwise not occur if it was not for the attributes of the single reel 104. The reels 102 include a 3-of-a-kind "J" symbol win 120 (middle positions of the first three reels 102A-102C) that is multiplied by a "2×" multiplier based on the "+2" attribute associated with the "J" "Power" symbol in the first position 104A of the single reel 104. The reels 102 further include a 5-of-a-kind "Q" symbol win 122 (middle positions of all five reels 102A-102E) in both left-to-right and right-to-left directions based on the "⇆" multi-directional attribute associated with the "Q" "Power" symbol in the third position 104C of the single reel 104.

The reels 102 also include wins with an accumulative effect when applied to a winning combination 124 achieved by "A" symbols in the reels 102. The wins include a 3-of-a-kind "A" symbol scattered win (top position of the first reel 102A, bottom position of the third reel 102C, and top position of the fourth reel 102D) based on the "SCATTER" attribute associated with the "A" "Power" symbol in the fifth position 104E of the single reel 104. The accumulative effect multiplies the 3-of-a-kind "A" symbol scattered win with a "3×" multiplier based on the "+3" attribute associated with the "A" "Power" symbol in the fourth position 104D of the single reel 104. The accumulative effect further triggers a mini jackpot based on the "JACKPOT" attribute associated with the "A" "Power" symbol in the sixth position 104F of the single reel 104.

Referring, generally, to FIGS. 6-12, different instances of the game screen 100 illustrate various features in which symbol attributes have an accumulated effect when applied to associated winning combinations. In reference to FIG. 6, only the first "J" "Power" symbol 104A is activated and results in a single "Power Win" in which a "J" winning combination 130 displayed by reels 102 is multiplied with a "2×" multiplier. The "2×" multiplier is based on the "+2" attribute displayed in the first symbol position 104A. The activation of the first symbol 104A is based on the player's wager of 1 credit, as displayed in the bet meter 114. For convenience, the game screen 100 notifies the player in the multiplier indicator 106 that "J Pays ×2."

Figure 7:
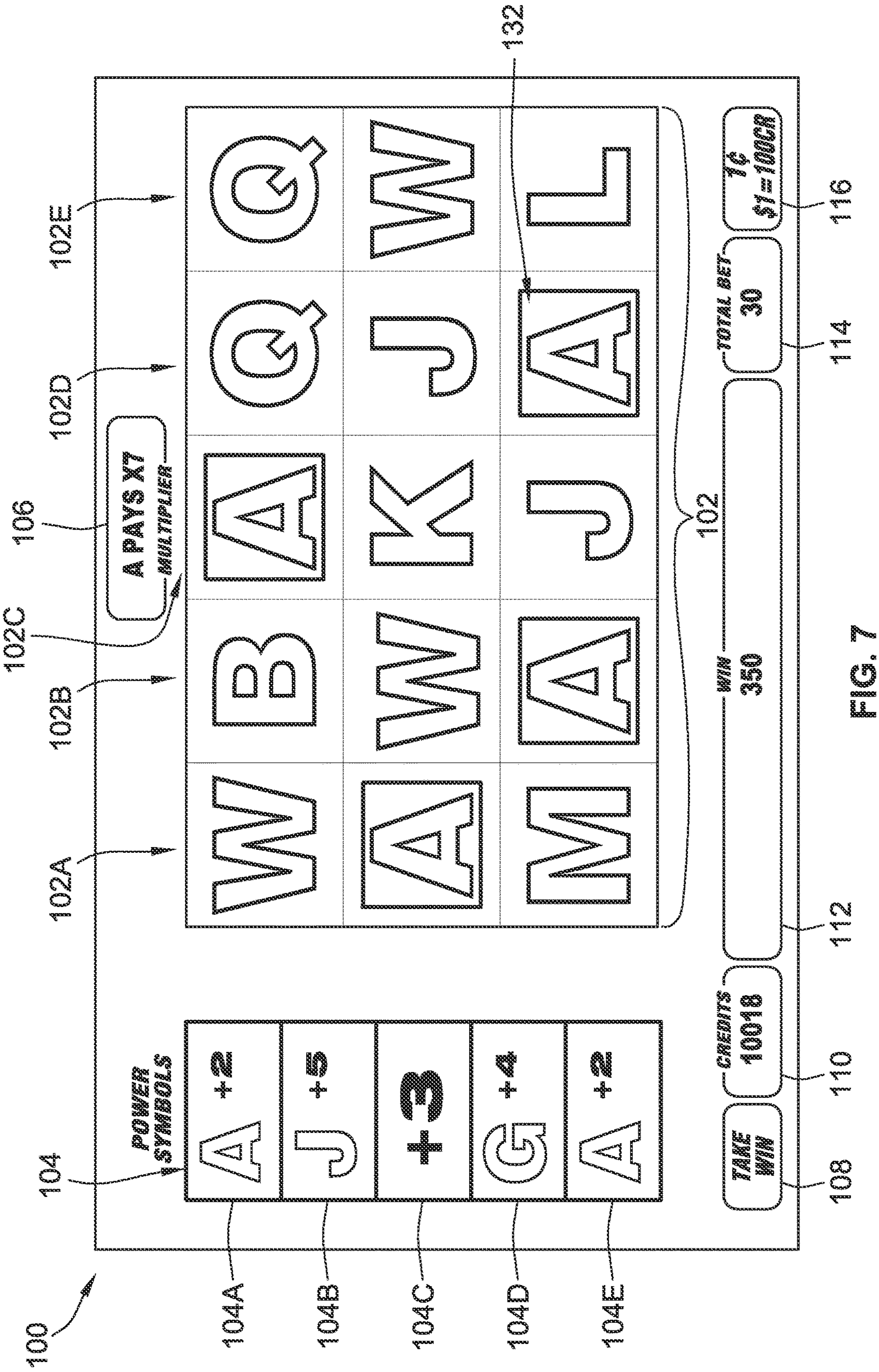
FIG. 7 illustrates another instance of the game screen of FIG. 4 in which all "Power" symbols are activated, according to an embodiment of the present invention.

In reference to FIG. 7, all five "Power" symbols 104A-104E are activated. The reels 102 show a single winning combination 132 of four "A" scatter symbols. Based on an accumulated multiplier value of "7×" associated with two "A" "Power" symbols and an additive wild multiplier (i.e., "+2" attribute of the first "Power" symbol 104A, the additive wild multiplier "+3" third "Power" symbol 104C, and the "+2" attribute of the fifth "Power" symbol 104E), a single "Power Win" with a "7×" multiplier is awarded.

Figure 8:
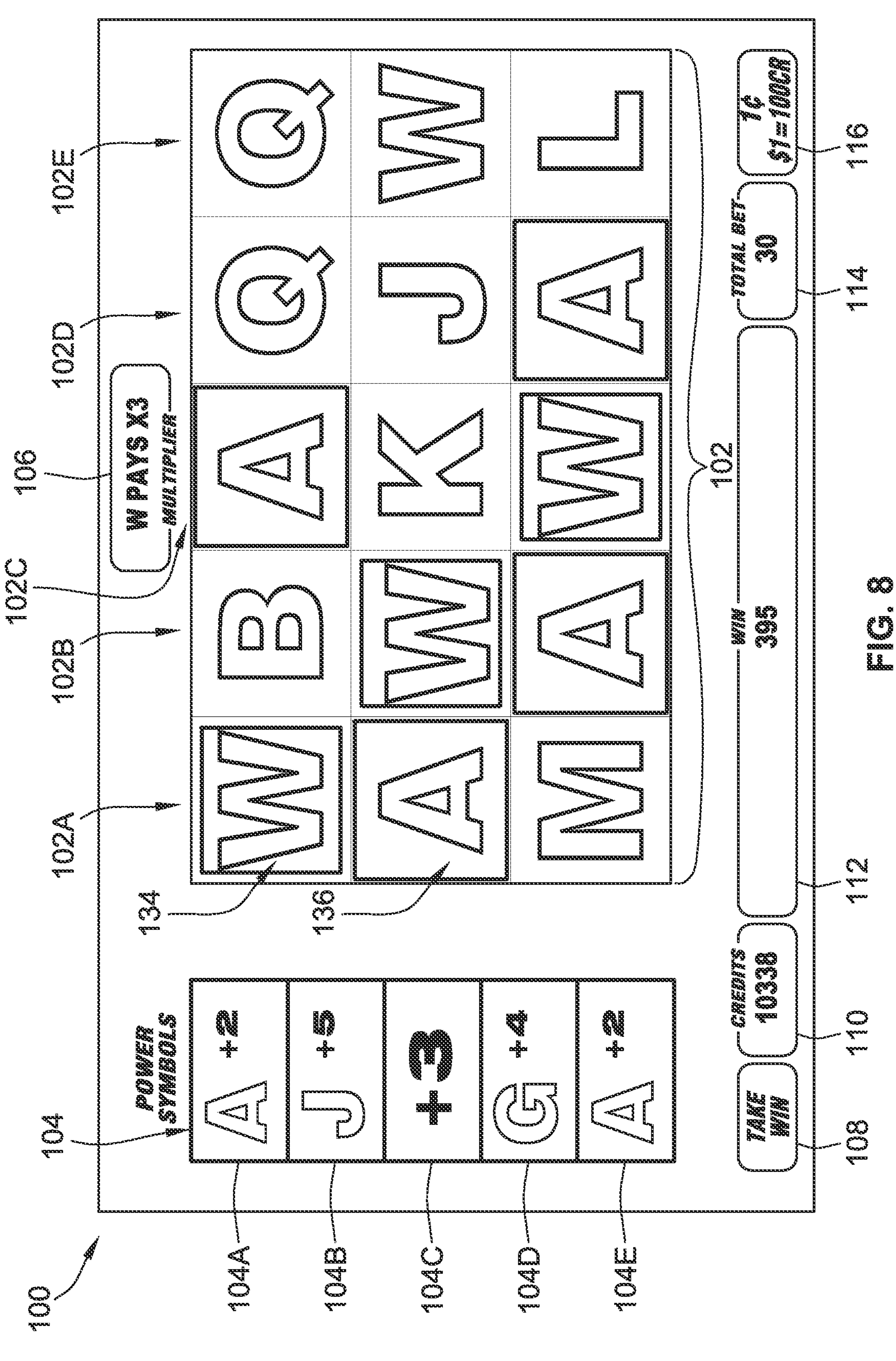
FIG. 8 illustrates another instance of the game screen of FIG. 4 in which two "Power Wins" are achieved, according to an embodiment of the present invention.

In reference to FIG. 8, all five "Power" symbols 104A-104E are activated. The reels 102 show two winning combinations—a first winning combination 134 of 3-of-a-kind "W" symbols and a second winning combination 136 of 4-of-a-kind scattered "A" symbols. The first winning combination 134 becomes a "Power Win" multiplied by a "3×" multiplier based on the additive wild multiplier "+3" "Power" symbol 104C. The second winning combination 136 becomes a "Power Win" multiplied by a "7×" multiplier based on the "+2" attribute of the first "Power" symbol 104A, the additive wild multiplier "+3" third "Power" symbol 104C, and the "+2" attribute of the fifth "Power" symbol 104E. The multiplier indicator 106 indicates the "Power Wins" associated with each winning combination 134, 136, alternatively displaying each "Power Win" (currently displaying that "W Pays ×3").

Figure 9:
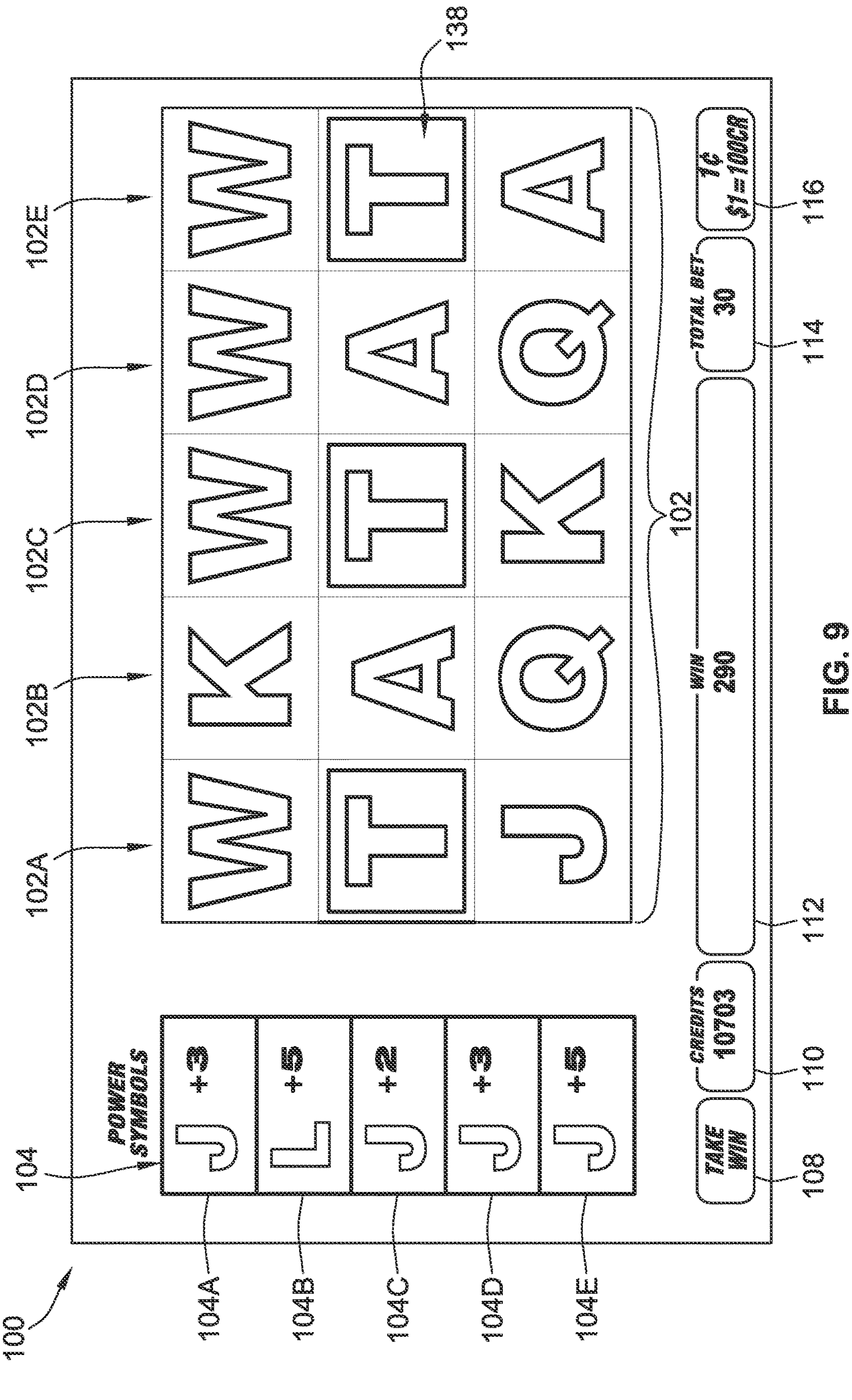
FIG. 9 illustrates another instance of the game screen of FIG. 4 in which a free games feature is achieved, according to an embodiment of the present invention.

In reference to FIG. 9, all five "Power" symbols 104A-104E are activated. The reels 102 show a winning combination 138 in which three or more bonus trigger symbols "T" on the reels 102 activate a free game feature. In this instance, three scattered "T" symbols are displayed in the middle positions of the first reel 102A, the third reel 102C, and the fifth reel 102E. The winning combination 138 that awards a triggering pay (which is not multiplied by any "Power" symbols) and a plurality of free games (e.g., 10, 20, or 40 free games).

Figure 10:
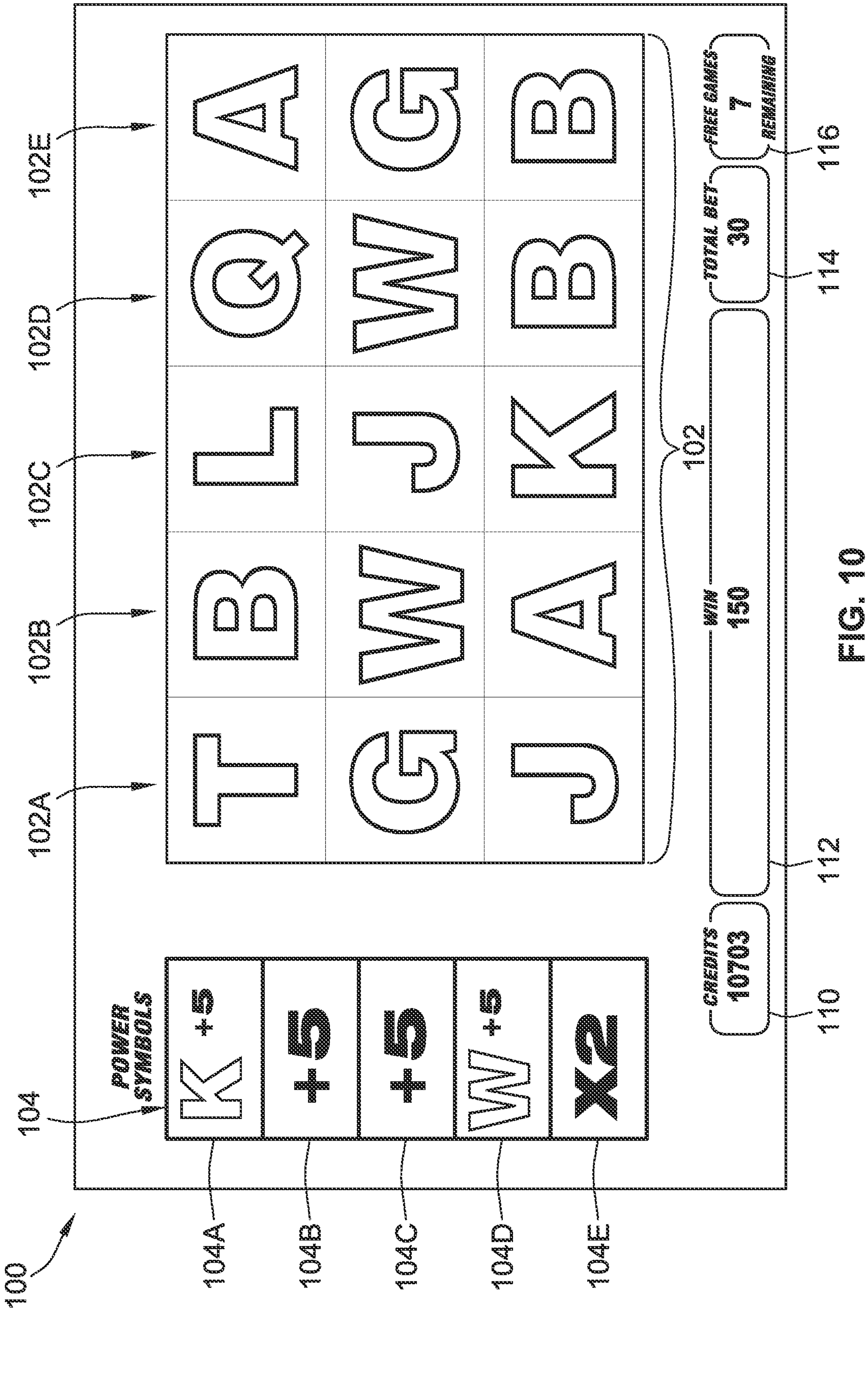
FIG. 10 illustrates another instance of the game screen of FIG. 4 in which a wild multiplicative multiplier is achieved, according to an embodiment of the present invention.

In reference to FIG. 10, all five "Power" symbols 104A-104E are activated during a free game feature. As displayed in the indicator 116, 7 free games remain to be played during the free game feature. During the free game feature, a special multiplicative wild multiplier is randomly selected. Unlike the additive wild multiplier, the multiplicative wild multiplier is applied to all the "Power Wins" by doubling each "Power Win." By way of example, 4 "×2" multiplicative wild multipliers and one "+5" additive wild multiplier will multiply any "Power Win" by "80×" (2*2*2*2*5=80). In the instance illustrate in FIG. 10, any "Power Win" is multiplied by "20×" because the two additive wild multipliers of "+5" (second and third "Power" symbols 104B, 104C) equal to "10×" and, then, the "10×" multiplier is further multiplied by the "×2" multiplicative wild multiplier (fifth "Power" symbol 104E). In other words—20=(5+5)*2.

In contrast, for example, any win based on "W" symbols displayed in reels 102 will result in a "Power Win" that is multiplied with a "30×" multiplier. The "30×" multiplier is based on the accumulated value in which the two additive wild multipliers of "+5" (second and third "Power" symbols 104B, 104C) are further added to the "+5" attribute of the fourth "W" "Power" symbol, resulting in a "15×" multiplier, which is further multiplied by the "×2" multiplicative wild multiplier (fifth "Power" symbol 104E). In other words: 30=(5+5+5)*2.

Figure 11:
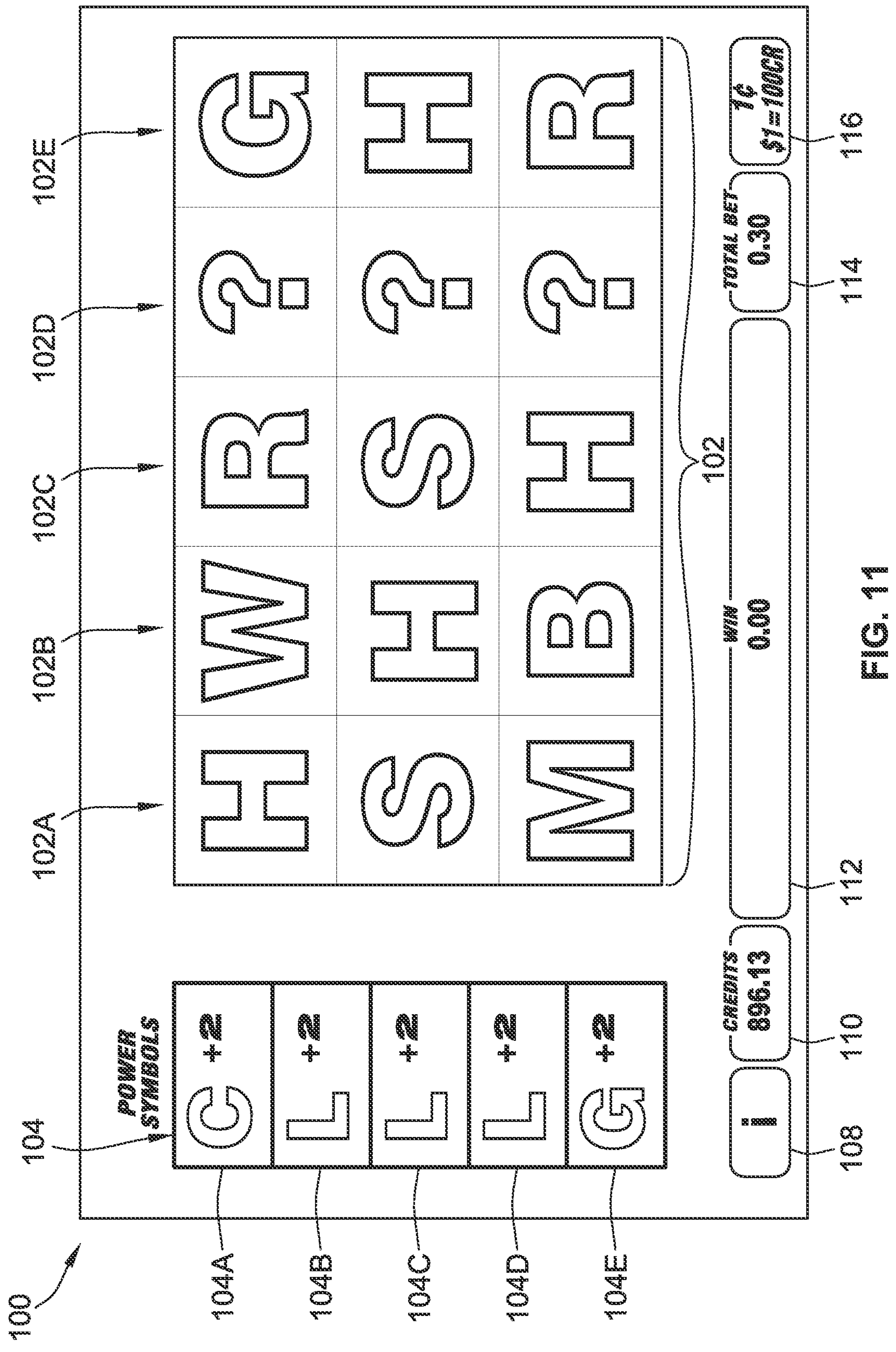
FIG. 11 illustrates another instance of the game screen of FIG. 4 in which mystery symbols are achieved, according to an embodiment of the present invention.
Figure 12:
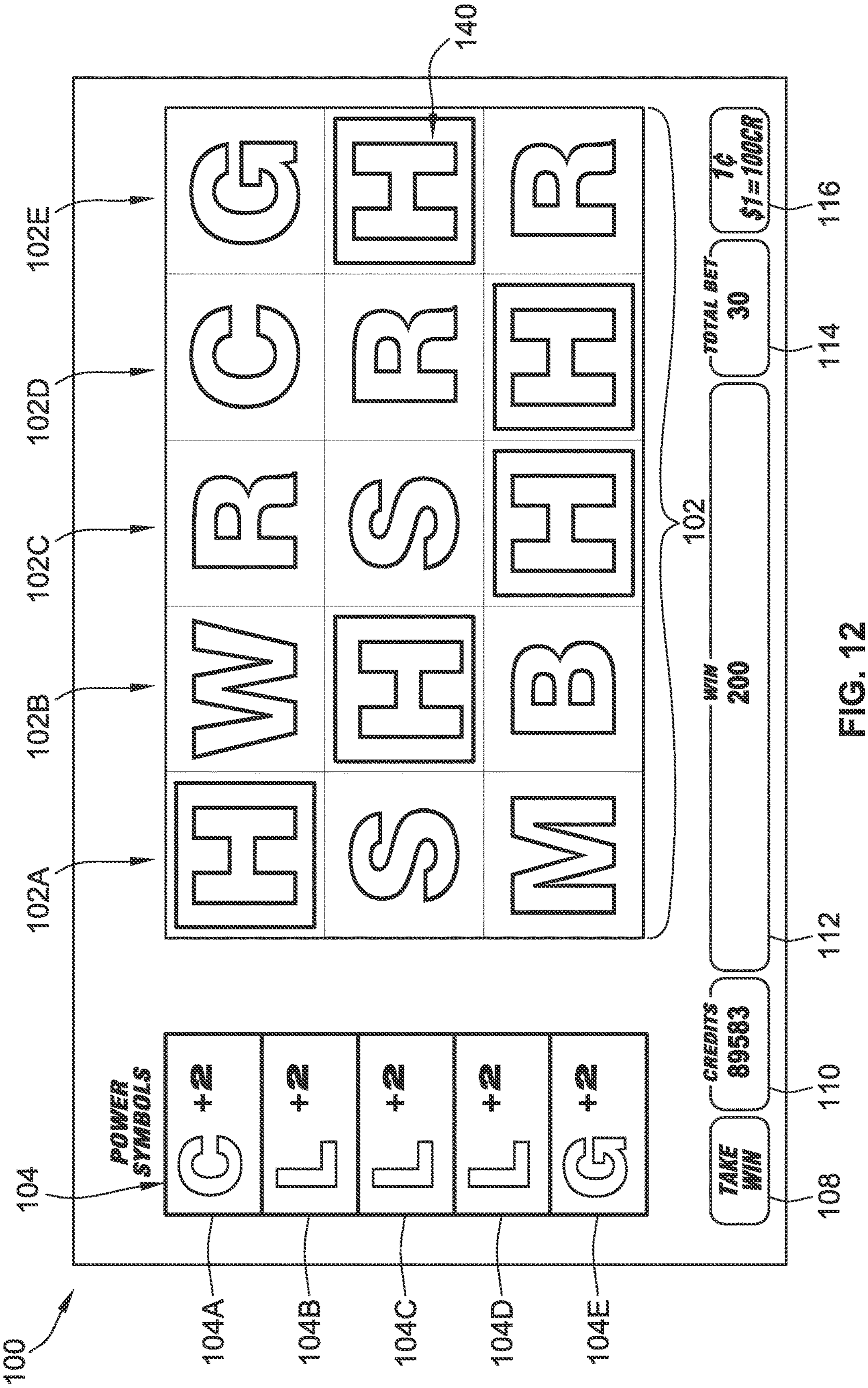
FIG. 12 illustrates another instance of the game screen of FIG. 11 in which the mystery symbols are revealed.

In reference to FIGS. 11 and 12, a game feature includes Mystery symbols that convert to other symbols on the reels 102. For example, in FIG. 11 three "?" Mystery symbols are displayed on the fourth reel 102D. In FIG. 12, the three "?" Mystery symbols on the fourth reel 102D have converted to a "C" symbol (top position), an "R" symbol (middle position), and an "H" symbol (bottom position). As a result, a winning combination 140 is achieved by 5-of-a-kind "H" symbols. Because there are no applicable "Power" symbols in the single reel 104, the winning combination 140 is not a "Power Win."

According to an alternative embodiment, a Jackpot trigger option is achieved by having, for example, 5-of-a-kind in the single reel 104. Thus, by way of example in reference to FIG. 12, the Jackpot trigger option is achieved if all "Power" symbols 104A-10E are "C" symbols.

Figure 13:
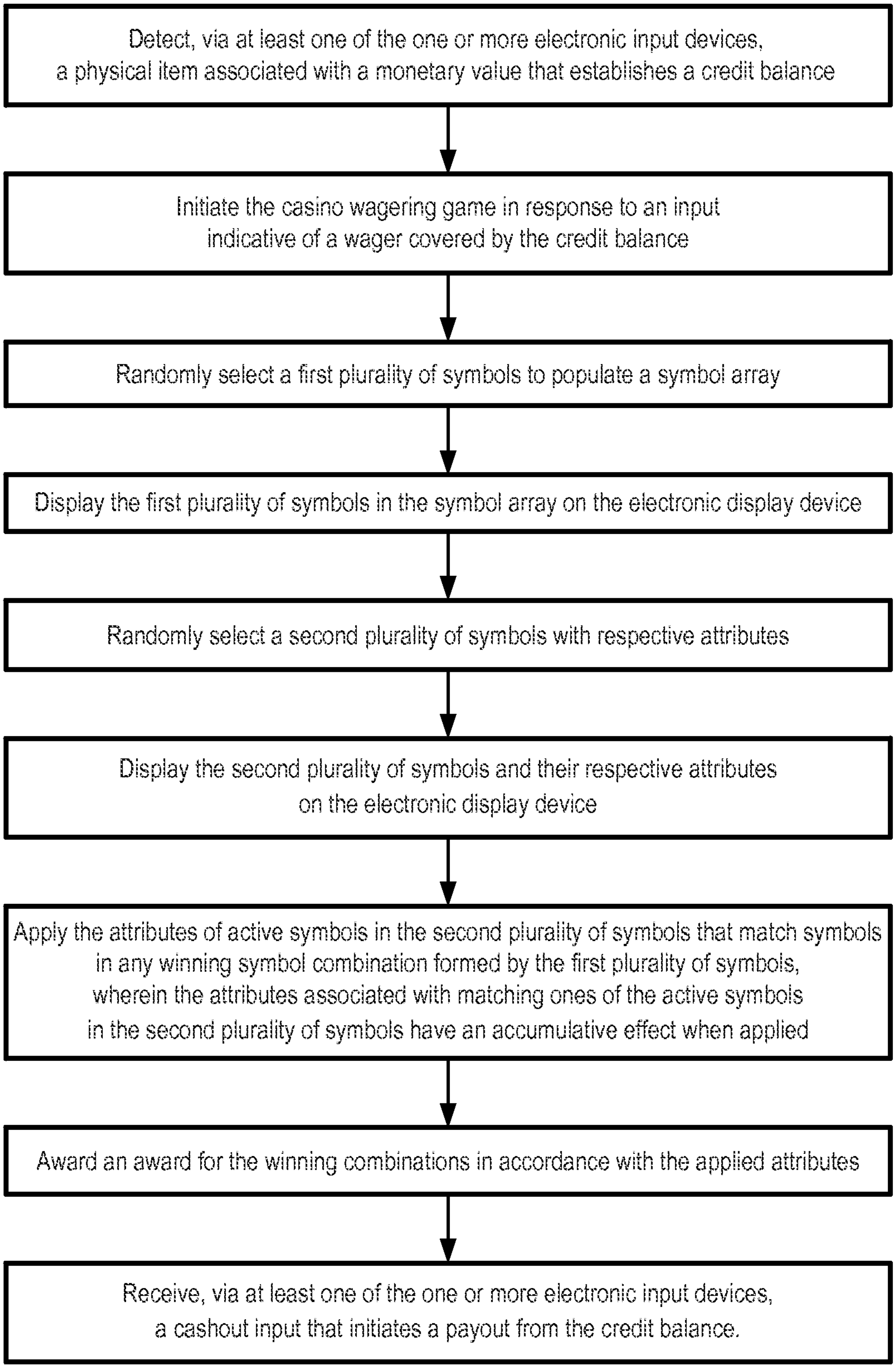
FIG. 13 is a flowchart for a data processing method that that corresponds to instructions executed by a controller in accord with at least some aspects of the disclosed concepts.

FIG. 13, described by way of example above, represents one algorithm that corresponds to at least some instructions stored and executed by the game-logic circuitry 40 in FIG. 2 to perform the above described functions associated with the disclosed concepts.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming system, the gaming system including game-logic circuitry and a regulated gaming machine, the gaming machine primarily dedicated to playing at least one casino wagering game, the gaming machine including one or more electronic display devices and one or more electronic input devices, the method comprising:

detecting, via at least one of the one or more electronic input devices, a physical item associated with a monetary value that establishes a credit balance;

initiating the casino wagering game in response to an input indicative of a wager covered by the credit balance;

randomly selecting, by the game-logic circuitry, a first plurality of symbols to populate a symbol array;

displaying the first plurality of symbols in the symbol array on at least one of the one or more electronic display devices;

randomly selecting, by the game-logic circuitry, a second plurality of symbols with respective attributes;

displaying the second plurality of symbols and their respective attributes on at least one of the one or more electronic display devices;

applying the attributes of active symbols in the second plurality of symbols that match symbols in any winning symbol combination formed by the first plurality of symbols, wherein the attributes associated with matching ones of the active symbols in the second plurality of symbols are accumulated when applied;

awarding, by the game-logic circuitry, an award for the winning combinations in accordance with the applied attributes; and receiving, via at least one of the one or more electronic input devices, a cashout input that initiates a payout from the credit balance.

2. The method of claim 1, wherein the attributes include one or more of a multiplier value, a free game, a jackpot, a multi-directional win, a scatter win, or a symbol substitution.

3. The method of claim 1, wherein the attributes are applied to one or more of the symbols from the second plurality of symbols that appear in and contribute to winning symbol combinations in the symbol array.

4. The method of claim 1, further comprising receiving, via at least one of the one or more electronic input devices, an activation input that selects the number of the active symbols in the second plurality of symbols.

5. The method of claim 4, wherein the number of the active symbols in the second plurality of symbols is based on wager size.

6. The method of claim 1, wherein one or more of the first plurality of symbols in the symbol array are initially displayed as mystery symbols.

7. The method of claim 1, wherein the second plurality of symbols and their respective attributes are displayed prior to the displaying of the first plurality of symbols in the symbol array.

8. The method of claim 1, wherein the second plurality of symbols further includes a wild multiplier that is applicable to all winning combinations, the wild multiplier being associated with all symbols.

9. The method of claim 1, wherein the first plurality of symbols to populate symbol array are borne by a plurality of spinning reels, and the second plurality of symbols with the respective attributes are borne by a single spinning reel adjacent to the plurality of spinning reels, the single spinning reel stopping before a first spinning reel of the plurality of spinning reels.

10. The method of claim 1, wherein each symbol of the first plurality of symbols and each symbol of the second plurality of symbols is randomly selected from symbols of a single pay table.

11. A gaming system, comprising:

a regulated gaming machine primarily dedicated to playing at least one casino wagering game, the gaming machine including an electronic display device and one or more electronic input devices; and game-logic circuitry configured to:

detect, via at least one of the one or more electronic input devices, a physical item associated with a monetary value that establishes a credit balance, initiate the casino wagering game in response to an input indicative of a wager covered by the credit balance, randomly select a first plurality of symbols to populate a symbol array, display the first plurality of symbols in the symbol array on the electronic display device, randomly select a second plurality of symbols with respective attributes, display the second plurality of symbols and their respective attributes on the electronic display device, apply the attributes of active symbols in the second plurality of symbols that match symbols in any winning symbol combination formed by the first plurality of symbols, wherein the attributes associated with matching ones of the active symbols in the second plurality of symbols have an accumulative effect when applied, award an award for the winning combinations in accordance with the applied attributes, and receive, via at least one of the one or more electronic input devices, a cashout input that initiates a payout from the credit balance.

12. The gaming system of claim 11, further including a random element generator configured to generate one or more random elements, the outcome being randomly selected based, at least in part, on the one or more random elements.

13. The gaming system of claim 12, wherein the random element generator and the game-logic circuitry reside within a gaming cabinet of the gaming machine.

14. The gaming system of claim 11, wherein the attributes include one or more of a multiplier value, a free game, a jackpot, a multi-directional win, a scatter win, or a symbol substitution.

15. The gaming system of claim 11, wherein the game-logic circuitry is further configured to receive, via at least one of the one or more electronic input devices, an activation input that selects the number of the active symbols in the second plurality of symbols.

16. The gaming system of claim 15, wherein the number of the active symbols in the second plurality of symbols is based on wager size.

17. The gaming system of claim 11, wherein the second plurality of symbols and their respective attributes are displayed prior to the displaying of the first plurality of symbols in the symbol array.

18. A regulated gaming machine primarily dedicated to playing at least one casino wagering game, comprising:

an electronic display device;

one or more electronic input devices, and game-logic circuitry configured to:

detect, via at least one of the one or more electronic input devices, a physical item associated with a monetary value that establishes a credit balance, initiate the casino wagering game in response to an input indicative of a wager covered by the credit balance, spin and stop a plurality of symbol-bearing reels to display a first plurality of symbols on the electronic display device, the first plurality of symbols being selected from symbols of a pay table, spin and stop a single symbol-bearing reel to display a second plurality of symbols with respective attributes on the electronic display device, the single reel being displayed adjacent to the plurality of reels, the second plurality of symbols being selected from symbols of the pay table, apply the attributes of active symbols in the second plurality of symbols that match symbols in any winning symbol combination formed by the first plurality of symbols, the attributes associated with matching ones of the symbols in the second plurality of symbols having an accumulative effect when applied, award an award for the winning combination in accordance with the applied attributes, and receive, via at least one of the one or more electronic input devices, a cashout input that initiates a payout from the credit balance.

19. The regulated gaming machine of claim 18, wherein the single reel stops spinning before a first spinning reel of the plurality of reels.

20. The regulated gaming machine of claim 18, wherein the number of active symbols in the second plurality of symbols is based on a wager size.

* * * * *